United States Patent
Jaramillo Botero

(10) Patent No.: US 10,941,047 B2
(45) Date of Patent: Mar. 9, 2021

(54) METHOD AND APPARATUS FOR PRODUCING HIGH-PURITY SYNTHETIC MAGNETITE BY OXIDIZING METAL WASTE

(71) Applicant: Gabriel Santiago Jaramillo Botero, Sogamoso (CO)

(72) Inventor: Gabriel Santiago Jaramillo Botero, Sogamoso (CO)

(*) Notice: Subject to any disclaimer, the term of this patent is extended or adjusted under 35 U.S.C. 154(b) by 405 days.

(21) Appl. No.: 15/970,699

(22) Filed: May 3, 2018

(65) Prior Publication Data

US 2018/0251382 A1 Sep. 6, 2018

Related U.S. Application Data

(63) Continuation-in-part of application No. 14/191,230, filed on Feb. 26, 2014, now abandoned.

(51) Int. Cl.
| | | |
|---|---|---|
| *C01G 49/00* | (2006.01) | |
| *C01G 49/08* | (2006.01) | |
| *B01J 19/28* | (2006.01) | |
| *B01J 6/00* | (2006.01) | |

(52) U.S. Cl.
CPC .............. *C01G 49/08* (2013.01); *B01J 6/002* (2013.01); *B01J 19/28* (2013.01); *B01J 2219/00256* (2013.01); *C01P 2006/80* (2013.01)

(58) Field of Classification Search
CPC .. C01G 49/08; H01F 1/10; B01J 6/002; B01J 2219/00256; C01P 2006/80
USPC ........................................ 423/632, 138, 152
See application file for complete search history.

(56) References Cited

U.S. PATENT DOCUMENTS

| | | | |
|---|---|---|---|
| 672,192 A | | 4/1901 | MacDonald |
| 2,631,085 A | * | 3/1953 | Bennetch ............... C01G 49/08 423/632 |
| 2,693,409 A | | 11/1954 | Stephens, Jr. |
| 3,630,675 A | * | 12/1971 | Prasky ................... C22B 1/248 75/401 |
| 3,928,709 A | | 12/1975 | Audran et al. |
| 4,311,684 A | | 1/1982 | Umeki |
| 4,376,714 A | | 3/1983 | Pingaud |
| 4,436,681 A | | 3/1984 | Barczak et al. |
| 4,629,500 A | | 12/1986 | Janz et al. |
| 5,348,160 A | | 9/1994 | Kindig |
| 5,512,195 A | | 4/1996 | Mano et al. |
| 5,749,791 A | | 5/1998 | Passeri, Jr. |
| 5,750,045 A | | 5/1998 | Nihira et al. |
| 6,302,952 B1 | | 10/2001 | Mobbs et al. |
| 6,827,757 B2 | | 12/2004 | Ozaki et al. |
| 7,217,400 B2 | * | 5/2007 | Steenwinkel ...... C01G 49/0018 23/305 F |
| 7,744,848 B2 | | 6/2010 | Nickels et al. |
| 2007/0110648 A1 | | 5/2007 | Nickels et al. |

* cited by examiner

*Primary Examiner* — Steven J Bos
(74) *Attorney, Agent, or Firm* — Kirk A. Buhler; Buhler & Associates Patenting

(57) ABSTRACT

The invention relates to a method for producing magnetite with a purity of no less than 90% and higher than 98%, by oxidation of pulverized wustite (iron oxide), at temperatures ranging from 200° C. to 800° C., with the addition of water in liquid or steam form, in counter-current or concurrently, in an externally heated reaction chamber with a controlled atmosphere. The amount of water used to oxidize the wustite being 60 to 500 ml per kilogram of wustite, the grains of wustite powder are injected into the reaction chamber having a size no greater than 100 μm for optimal reaction.

20 Claims, 4 Drawing Sheets

METHOD AND APPARATUS FOR PRODUCING HIGH-PURITY SYNTHETIC MAGNETITE BY OXIDIZING METAL WASTE

CROSS REFERENCE TO RELATED APPLICATION

This application is a continuation-in-part of applicant's co-pending application Ser. No. 14/191,230 filed Feb. 26, 2014 that claims priority to WO2013076539 filed on May 30, 2013 and CO6380006 filed on Feb. 15, 2012 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention consists of a method for converting wustite (iron oxide) into high purity synthetic magnetite. Specifically, the invention describes a process of oxidizing wustite in a reactor under high temperature and controlled atmosphere with a flow of water or water vapor flow. The process can occur, in counter flow or concurrent flow of the flow of water or water vapor flow. The process operates for a set time to allow for the reaction and conversion from wustite to magnetite.

Description of Related Art including information disclosed under 37 CFR 1.97 and 1.98:

DESCRIPTION OF THE TECHNOLOGY

Magnetite can be obtained from mining natural deposits. Extraction of the magnetite involves methods and machines that don't have a significant impact on the environment. The method is costly due to the hardness of rock mineral magnetite.

For several years it is known that compound hematite $Fe_2O_3$ can be converted into magnetite $Fe_3O_4$. Hematite is an iron ore reddish brown by-product that is produced from the regeneration of hydrochloric acid used in pickling or cleaning of steel wires in processes such as electroplating. The byproduct has been traditionally obtained from iron chloride that is widely used in the steel wire processing industry. Synthetic magnetite is obtained by a reduction from this process and is used for the magnetic properties, or as a pigment.

It is known that the conversion of hematite to magnetite occurs in the presence of a reducing agent such as hydrogen, carbon monoxide, methane gas or a liquid such as oil. The presence of carbon monoxide, liquid petroleum gas, methane gas or natural gas, acts as a reducing agent allowing the reduction of hematite to magnetite. U.S. Pat. Nos. 5,348,160 and 5,749,791 describe this conversion.

It has also been known that hematite $Fe_2O_3$ can be produced from an inorganic non-ferro powder by exposing the powder to temperatures of about 200 to 700° C. in the presence of a reducing gas. The process is suspend at a midway reduction to produce a partially reduced powder. The surface of the partially reduced powder is then oxidized with an oxygen-containing gas to produce a powder comprising of magnetite and iron. The reducing gas may be hydrogen gas, carbon monoxide gas, methane gas or ethane gas as disclosed in U.S. Pat. No. 6,827,757. The purity of the process is approximately 83%.

In the metallurgical industry, a lot of metallic waste of 2% to 3% (called mill scale), is produced for each heating. The mill scale is formed as a result of oxidation caused by the high temperatures, generally exceeding 800° C. This creates an environmental impact due to the and cost of disposal of the mill scale. Blast furnace steelmakers can use a mill scale on clinker that can be add it to the furnace because this process involves $CO_2$ reduction. The cost of transportation makes it a very expensive raw material for recycling mill scales in the production of steel bars, steel sheets or electric furnaces and continuous casting. Metallic wastes have an approximate composition of 70% wustite, 25% magnetite, and 5% of hematite. The composition can vary depending on factors such as alloy composition that is produced under high temperature, heating time, applied temperature, or heat shock treatment, etc.

The mill scale is usually stacked or placed in large pits with other scrap metal, non-metal, or electric furnace slag. This requires the adaptation of land for this purpose but does not prevent the permanent and indefinite accumulation of this waste because there is no appropriate method of recycling. In Colombia 80,000 tons of steel are produced monthly in the three main steel producers, which leads to an output of 1600-2400 tons per month of scale.

STATE OF THE TECHNOLOGY

There are several processes known to magnetite, $Fe_3O_4$, $Fe_2O_3$, to produce Hematite. The conversion of the Hematite magnetite is done by a chemical reduction. The reducing agents commonly used for this process are hydrogen gas, carbon monoxide gas, methane gas, propane gas, ethane gas, etc.

Hematite magnetite can be converted by a chemical reduction. The reducing agents that are commonly used in this conversion process are hydrogen gas, carbon monoxide gas, methane gas, propane gas, ethane gas, etc.

Hematite spray of ferric chloride is used to produce Hematite granular at temperatures of about 900° C. to 1000° C. The reduction is done with hydrogen and carbon monoxide with granules of Hematite using the flame in a burner. Reducing conditions are maintained throughout the reactor with the injection of additional gas near the discharge zone as described in U.S. Pat. No. 4,436,681. In this patent neither the purity grades achieved nor the operating conditions are not disclosed.

The reduction of Hematite is also disclosed using a reducing gas in the presence of a non-ferrous inorganic compound powder at temperatures between to 200° C. and 700° C. The reduction is stopped around the middle of the process to produce a partially reduced powder. The partially reduced powder is then oxidized with a gas containing oxygen to produce a powder composed of magnetite and iron. The reducer can be hydrogen gas, carbon monoxide gas, methane gas or ethane gas as disclosed in U.S. Pat. No. 6,827,757. In this process a purity of 83% is obtained.

The reduction of Hematite by organic liquids or low-temperature aqueous mixtures (sludge) is also disclosed in U.S. Pat. Nos. 6,302,952, 5,512,195, 4,376,714 and 3,928,709.

The ancient art of reducing Hematite with other substances, such as waste oil, alcohols and steam, usually at temperatures below 700° C. is disclosed in U.S. Pat. Nos. 4,311,684, 2,693,409 and 672,192.

The process for producing magnetite is with the reduction of hematite that is obtained as a byproduct of regeneration of hydrochloric acid that is used to cleanse the steel before a galvanizing processing. The magnetite obtained using this method can have a purity of 98%. The reactor used in this process has an inclination of up to 5% to facilitate movement hematite from the entrance to the exit of the reactor. The process and reactor is disclosed in U.S. Pat. No. 7,744,848.

The techniques used in the above processes are aimed at the reduction of hematite using reducing agents and gases. The processes are expensive and involve a risk of environmental contamination. The yields, in terms of the magnetite conversion factor, are in the order of 80% except for the case of the method described in U.S. Pat. No. 7,744,848 where the purity of the magnetite can be 98%.

BRIEF SUMMARY OF THE INVENTION

It is an object of the process to oxidize wustite (iron oxide) with an injection of water vapor in a horizontal reactor (1) that is heated externally (3), using a concurrently or counter-currently flow of water or steam to produce synthetic magnetite.

It is an object of the invention is to provide a process and a product that includes a vapor-solid relationship, a ratio of wustite within the reactor power, and to provide simple instructions for obtaining high purity magnetite.

It is object of this invention to provide a process and a product in a temperature range of 200° C. to 800° C., and preferably at a temperature range of between 350° C. and 700° C.

It is another object of the process to contain at least 97% pure magnetite, and for the magnetite to have a magnetic saturation of more than 85.0 emu/g.

It is also the object for this process to be performed on a large scale with very low production costs.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 1 shows a schematized reactor design.
FIG. 2 is a front view of the load side.
FIG. 3 is a front view of the discharge side.
FIG. 4 shows a drawing of the pendular input seal system at the input end of the reactor.
FIG. 5 shows a drawing of the pendular output seal system at the output end of the reactor.
FIG. 6 is a diagram of the process where the wustite and the water vapor or water go upstream or in the opposite direction or countercurrent.
FIG. 7 is a diagram of the process where to wustite and the water vapor or water goes in the same direction or concurrent.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

Item Numbers And Description

1. Reactor.
2. Input seal.
3. Gas burners.
5. Bearing tracks.
6. Output seal.
7. Input screw.
8. Heating and reaction zone.
9. Output trap.
11. Cooling zone.
12. Loading zone.
13. Supply pipe for water or steam.
14. Ceramic blanket.
15. Output screw.
16. Output chute.
17. Support wheels.
18. Pendulum input strings.
19. Input frame.
20. Pendulum output strings.
21. Output frame.
22. Input screw drive motor.
23. Output screw drive motor.
25. Output of magnetite.

DETAILED DESCRIPTION OF THE INVENTION

This process produces high purity magnetite from wustite. In particular, the process oxedizes wustite powder with superheated water vapor to produce high purity magnetite. The wustite is oxidized in a reactor (1) with a countercurrent or a concurrent flow of water or water vapor over a period of time and at a temperature to allow for total oxidation of the wustite in magnetite.

The processes involved in the present invention described below.

FIG. 1 shows a schematized reactor design. The reactor (1) consists of four main stages: Stage 1 is a raw material loading zone (12) that is also shown in FIG. 2 as a front view of the load or input side. The reactor (1) is shown covered with the ceramic blanket (14). The reactor (1) is shown supported within the bearing tracks (5). Stage 2 is a heating and reaction zone (8) that uses gas burner (3) as an external heating system for the reaction of the wustite. The heating and reaction zone (8) has a length of about 60% of the length of the reactor (1). Stage 3 is the cooling zone (11) of the reactor (1). The cooling zone (11) can have fans that can accelerate cooling of material inside of the reactor. The cylindrical reactor (1) has a length to diameter ratio of 10 to 0.8. Stage 4 is output zone and is also shown in FIG. 3 as a front view of the discharge side. The reactor (1) is shown covered with the ceramic blanket (14). The reactor (1) is shown supported within the bearing tracks (5). The output is supported with pendulum output string (20) from the output frame (21). An output seal (6) encloses the end of the reactor (1). The reactor (1) uses a supply pipe (13) to supply an input of water or steam to the reactor (13). An output trap (9), traps the steam, gases and dust that is produced in the reactor (13). FIG. 1 shows that most, all or the entire length of the reactor (1) is insulated with a ceramic blanket (14) that has a roof that covers the reactor (1). The ceramic blanket (14) is made of cement or brick.

The term "wustite" refers to one of the forms of oxidation of iron. Wustite constituent (65 to 75%) of the husk, that is generated when steel and iron is produced. The raw material consisting of 73% wustite and 23% magnetite is fed into the reactor. Synthetic magnetite is produced from mill scale. Raw wustite material waste comes from a process of drawing steel wire. Mill scale is produced from cold rolling or hot rolling iron.

The "husk" is formed on the surface of steel or iron as steel or iron is exposed to temperatures, higher than 800° C. Husk is produced by mechanical processes and represents a decline of 2% to 3% by weight of the original steel or iron. The generation of husk is inherent in the production of steel and is measured as metal yield in a metallurgical process. For every 100 kg of steel that is heated above 1000° C. there is at least 2 kg of husk that is produced and less than or equal to 98 kg of steel.

The water used in this process is supplied in the form of liquid or steam. $H_2O_2$ hydrogen peroxide can be used for this process, but the high cost of hydrogen peroxide, as opposed to water does not make the use of hydrogen peroxide viable for a large scale industrial process.

Unlike all known processes where the thermochemical reaction is a reduction of the raw material, the process in this reaction is with oxidation, and therefore any ingredient can be used as a reactive oxidant. The oxidation reaction can occur in nature, but it is a long process, that occurs over several months or years. Temperature is used to increase the speed of oxidation in the presence of an oxidizing agent.

The reactor (1) has a heating and reaction zone (8) that causes the thermochemical reaction. Temperature is controlled in this heating and reaction zone (8) to generate magnetite. When the right combination of temperature and steam is added to the reactor an oxidation reaction converts wustite into magnetite. Water or steam is supplied through the supply pipe (13) to the reactor (1) at a rate of between 57 g to 570 g of water per kilogram of wustite. The process prevents magnetite (that is present in the raw material) to transform in an uncontrolled way to another type of oxide of iron-such as Hematite.

The body of the reactor (1) is a horizontal slender cylinder where one end serves as a raw material loading zone (12) and the other end serves as a cooling zone (11). The body of the reactor (1) has multiple bearing tracks (5) that are attached to the reactor (1) that rolls or turns on reactor support wheels (17). The rotary motion of the reactor (1) is provided by a motor (not shown). This allows the reactor (1) to turn independently from the input frame (19) and the output frame (21). Steam or water pipeline is supplied to the reactor (1) through the supply pipe (13). An output trap (9) collects dust and water vapor that can be located at different locations of the reactor (1) based upon the location of the supply pipe (13) and the material flow direction. The injection of the input of steam or water from the supply pipe (13) is in a concurrently or counter-currently direction.

Depending on the input direction of the material flow through the reactor (1). The output end of the reactor (1) traps the dust and steam (not shown). The inlet diameter opening of the cargo area of the raw material (12) is smaller than the opening of the outlet diameter. The difference in inlet and outlet diameters of the reactor (1) allows material to advance smoothly through the reactor (1) in one direction only. The ratio of production of the reactor is based upon the rate material is feed into the reactor by the input screw (7). The feed rate from the input screw (7) controls the exposure of raw material to the oxidizing environment within the reactor (1).

The oxidizing environment is controlled by the temperature, the steam and the reaction time. The speed of rotation of the reactor (1) does not affect the rate of production, but the speed of rotation of the reactor (1) facilitates exposure of dust to the oxidizing medium. The Interior of the reactor (1) walls have a series of baffles that keep the material in permanent agitation, and exposure to the oxidizing medium.

FIG. 4 shows a drawing of the pendulum input seal system at the input end of the reactor (1). The input end of the reactor (1) consists of an input frame (19). The input screw drive motor (22), the input screw (7) and the supporting connections are suspended from the input frame (19) by pendulum input strings (18). The input drive system is supported and hangs from the input frame (19) in an orientation that faces the mouth of the reactor (1). FIG. 1 shows that an input seal (2) between the input drive system and the reactor body. The input seal (2) prevent the uncontrolled outflow of gases, steam and dust into the environment. The seals (2) are preferably made from ceramic and create an airtight seal on the ends of the reactor (1). The output trap (9) traps the steam, gases and dust that is produced in the reactor (1). The input screw (7) feeder is attached to the pendulum input seal (2) system.

FIG. 5 shows a drawing of the pendular output seal system at the output end of the reactor (1). The output end of the reactor has an output frame (21). The receiving components from the output of the reactor (1) are hung with pendulum output strings (20). It is composed of a set of pendulum output strings (20), an output seal (6), an input of water or steam pipeline (13) for the entry of water vapor, an output screw (15), an output chute (16) where wustite drops into the output chute (16) and onto the output screw (15). Output drive screw motor (23) turns the output screw (15). The output screw (15) meters the collection of the synthetic magnetite that has a purity of between 95% and 98% by weight. The output screw (15) is attached to the pendulum output seal (6) system.

The input and output are designed to stay relatively still while the reactor spins on the input seal (2) and output seal (6) that are suspended from separate pendulum strings (18), (20). The pendular systems allow for the input and output portions of the reactor (1) to be permanently secured to the reactor to accommodate irregularities due to manufacturing production rates and changes caused by global warming. These seals are chosen to withstand high temperatures and wear by friction. The seals (2) on the ends of the reactor (1) prevent the uncontrolled outflow of gases, steam and dust into the environment. The seals (2) are preferably made from ceramic and create an airtight seal on the ends of the reactor (1).

Figure 1:
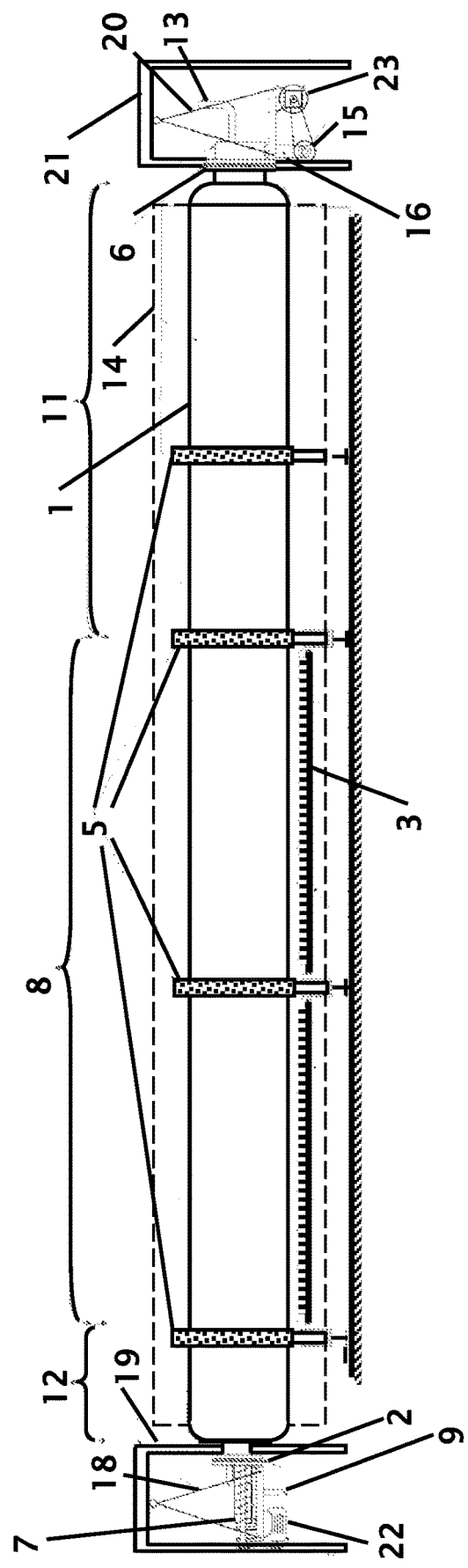
Figure 3:
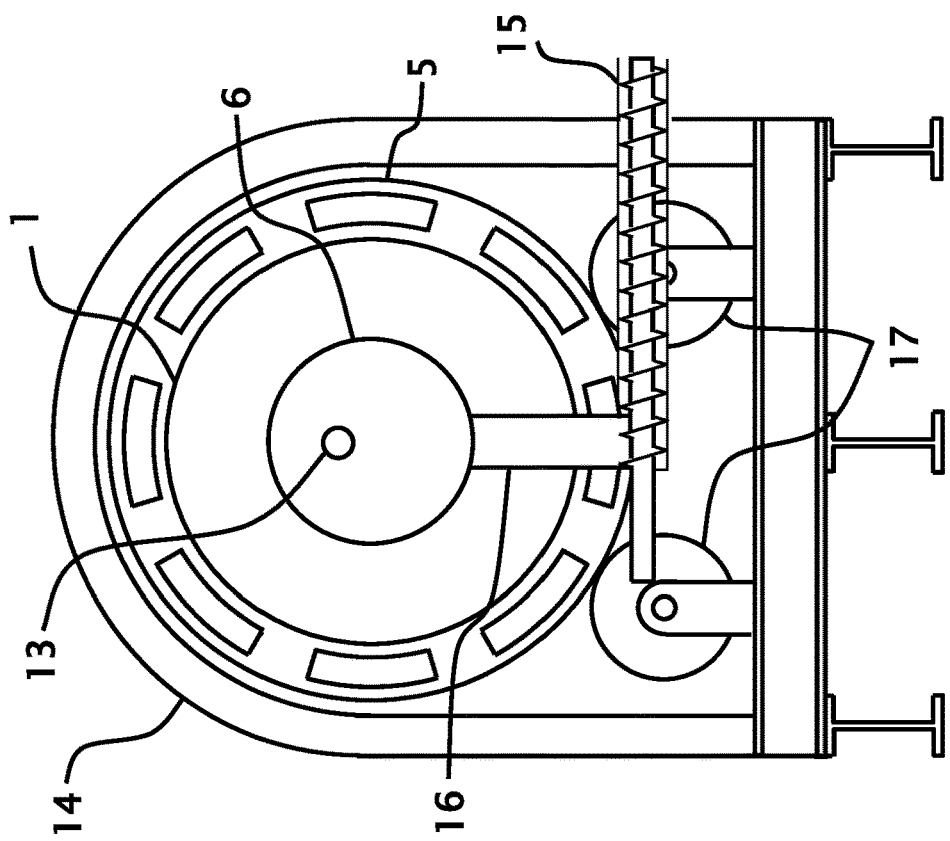
Figure 2:
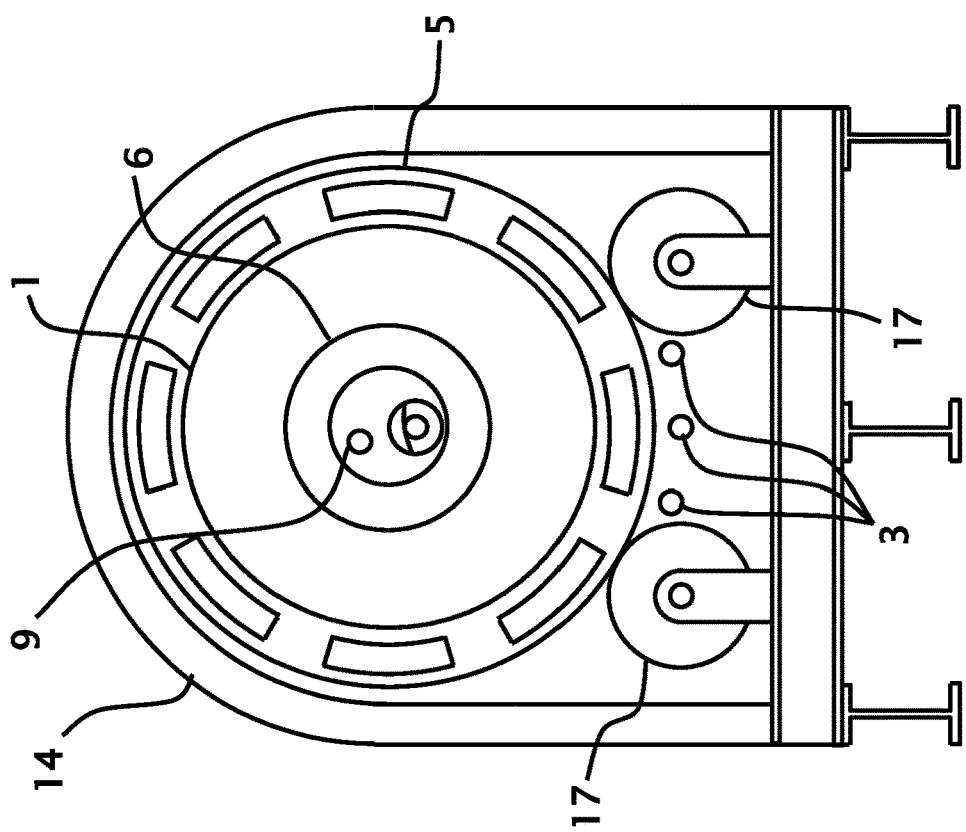
Figure 4:
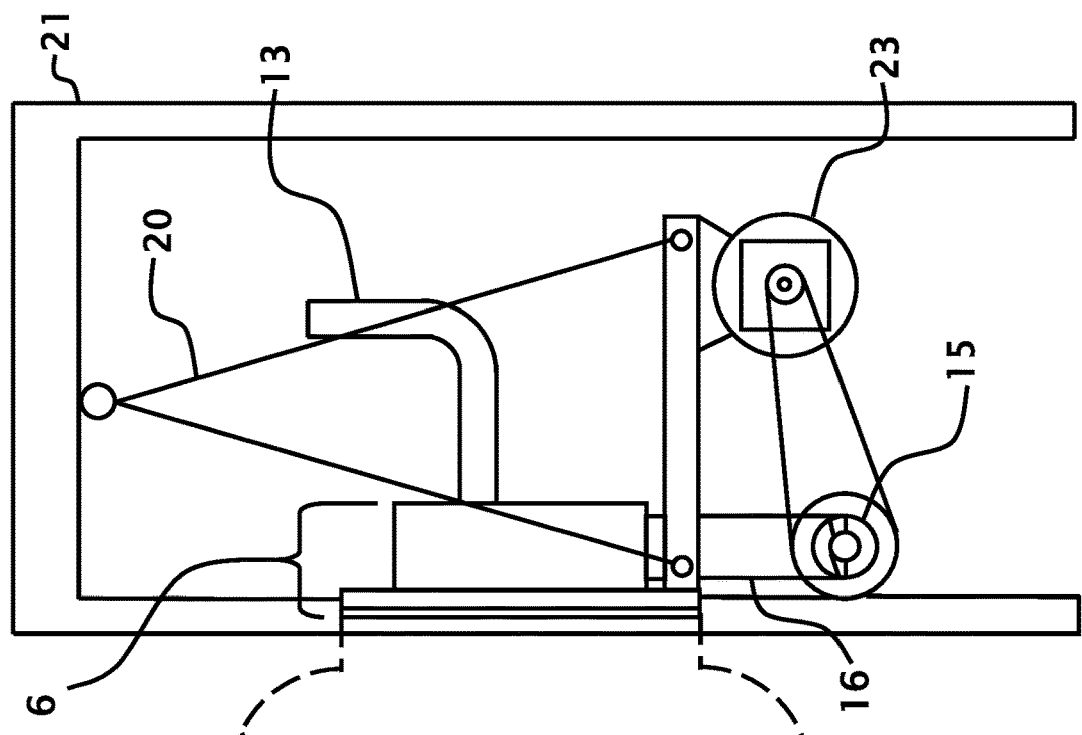
Figure 5:
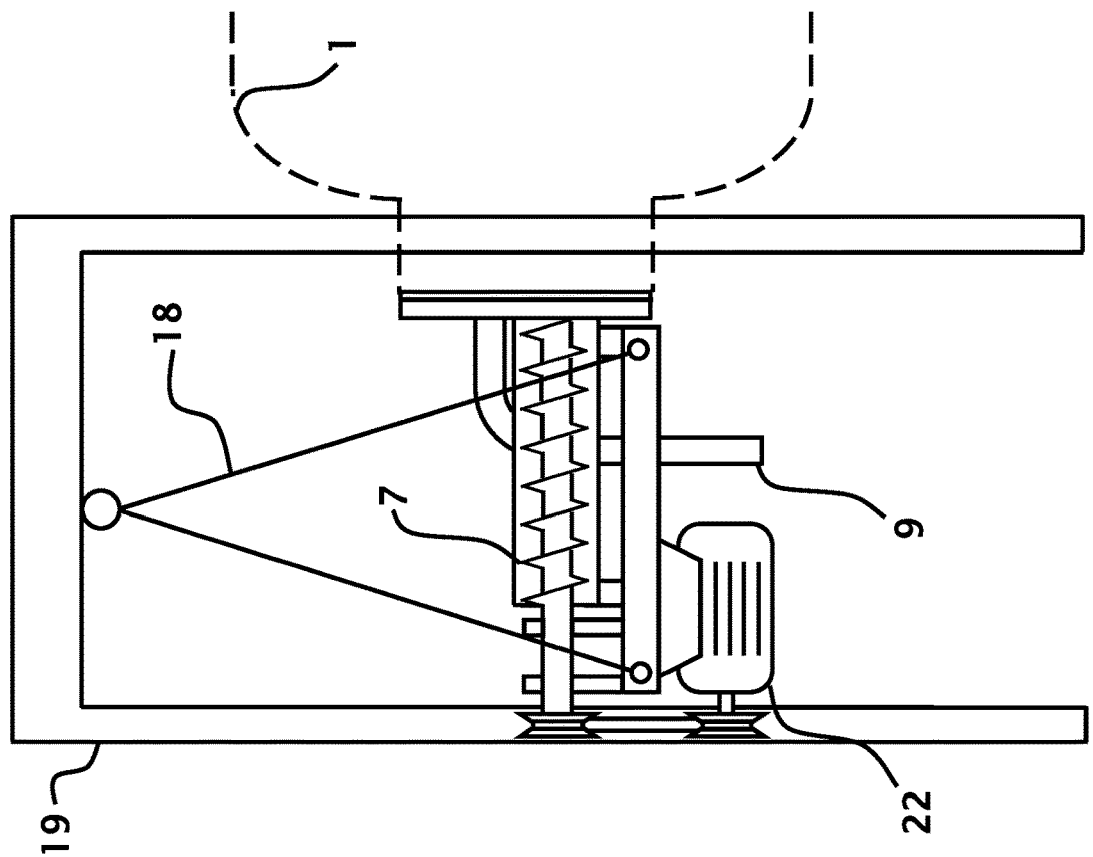
Figure 6:
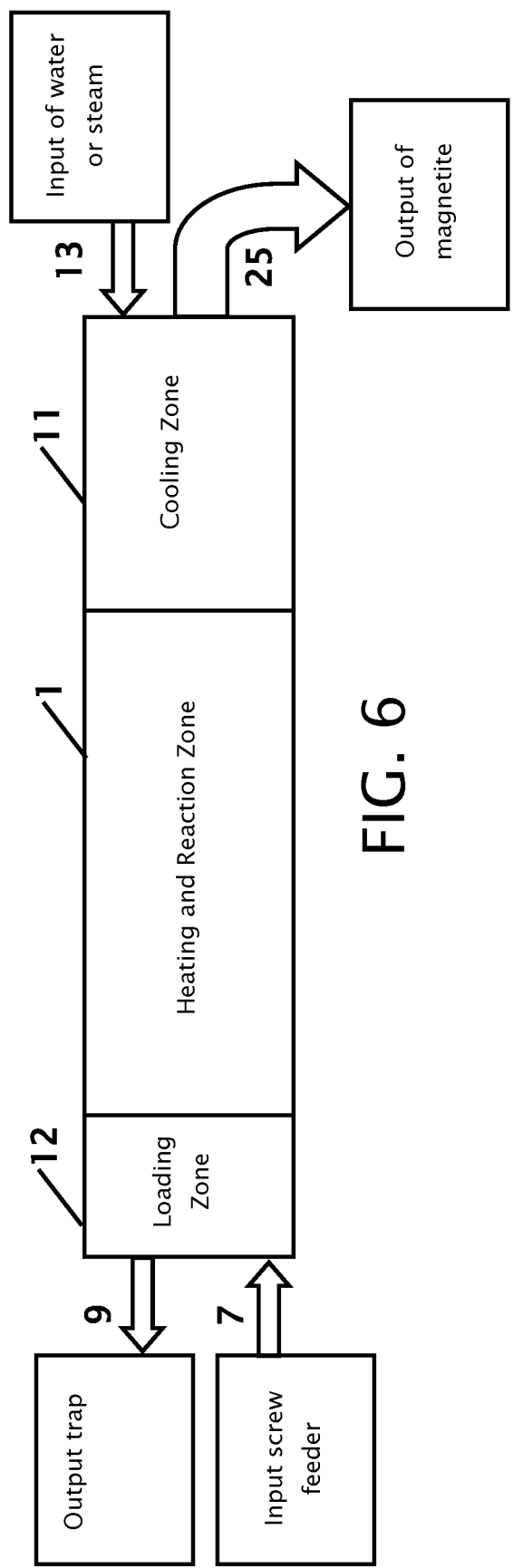
FIG. 6 is a diagram of the process where the wustite and the water vapor or water go upstream or in the opposite direction or countercurrent.

FIG. 6 is a diagram of the process of the invention, where the wustite and the water vapor or water goes upstream or in the opposite. The input screw (7) feeder feeds material into the loading zone of the reactor (1). In this embodiment, steam is supplied to the output side of the reactor (1). At the output end of the reactor (1) has the output of magnetite (25).

Figure 7:
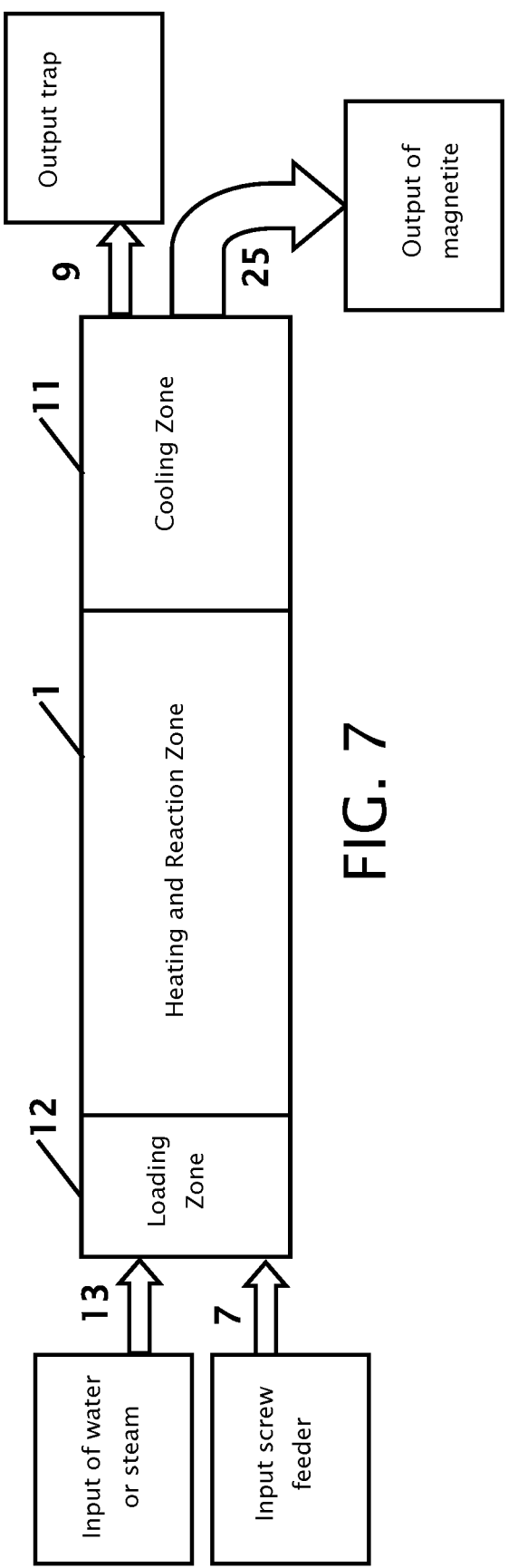
FIG. 7 is a diagram of the process where to wustite and the water vapor or water goes in the same direction or concurrent.

FIG. 7 is a schematic drawing of the invention process, where the wustite and the water vapor or water goes in the same direction or concurrent. The input screw (7) feeder feeds material into the loading zone of the reactor (1). In this embodiment, steam is supplied to the input side of the reactor (1). At the output end of the reactor (1) has the output of magnetite (25) and also the output trap (9) that traps the steam, gases and dust that is produced in the reactor (1).

The reactor (1) provides a process for producing synthetic magnetite. The process includes feeding wustite into a loading zone of the reactor (1) with an input screw (7) feeder that is attached with pendulum input strings (18) and an input seal (2) on input frame (19). The process supplied with water or steam using a supply pipe for water or steam (13) that is dispensed into the loading zone of the reactor as a thermochemical transformation reagent. The process uses an external heating system to increase the temperature of the thermochemical transformation reagent to a temperature between 200° C. and 800° C. to accelerate conversion of wustite to produce magnetite (25). The temperature of the thermochemical transformation reagent is 500° C. The input screw (7) feeder is attached to the pendulum output strings (20) with an exhaust filtering system that traps and prevents steam and dust pollutants from entering the atmosphere. The cooling and collecting of the output of synthetic magnetite (25) has a purity of between 95% and 98%.

The reactor provides a process for producing synthetic magnetite. The process includes feeding wustite into a loading zone of a reactor (1) with an input screw (7) feeder that is attached to a pendulum output strings (19). The process is supplied with water or steam that is dispensed into the reactor (1) with a supply pipe for water or steam (13) that is on an opposite side of the loading zone to cause a thermochemical transformation reagent.

An external heating system increases the temperature of the thermochemical transformation reagent to a temperature between 200° C. and 800° C. to accelerate conversion of wustite to output magnetite (25). The input screw (7) feeder is attached to the pendulum output seal system with an exhaust filtering system that traps and prevents steam and dust pollutants from entering the atmosphere. The cooling and collecting of the output of synthetic magnetite (25) has a purity of between 95% and 98%.

Thus, specific embodiments of a process for producing high purity synthetic magnetite have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable

The invention claimed is:

1. A process for producing synthetic magnetite comprising:
   feeding wustite into a loading zone of a reactor by means of an input screw feeder that is attached to a pendulum input seal system;
   using a water supply or steam supply to supply water or steam into said loading zone of said reactor as a thermochemical transformation reagent;
   using an external heating system to increase the temperature of said thermochemical transformation reagent to between 200° C. and 800° C. to accelerate conversion of wustite to synthetic magnetite;
   an output trap that traps gasses, dust and steam pollutants from entering the atmosphere, and
   an output screw that is attached to a pendulum output seal system, that meters collection of the synthetic magnetite that has a purity of between 95% and 98% by weight.

2. The process for producing synthetic magnetite according to claim 1 wherein the temperature of the reagent is 500° C.

3. The process for producing synthetic magnetite according to claim 1 wherein the external heating system is about 60% of the length of the reactor.

4. The process for producing synthetic magnetite according to claim 1 wherein the water or the steam is supplied to the reactor at a rate of between 57 g and 570 g per kilogram of wustite introduced to the reactor.

5. The process for producing synthetic magnetite according to claim 1 wherein the water or the steam and a mill scale are fed simultaneously into the reactor at opposite ends of the reactor and travel through the reactor in opposite directions.

6. The process for producing synthetic magnetite according to claim 1 wherein the raw material is from a process selected from the group consisting of steel wire drawing, scale from cold rolling iron and hot rolling iron.

7. The process for producing synthetic magnetite according to claim 6, wherein the wustite is mill scale from a process of rolling steel.

8. The process for producing synthetic magnetite according to claim 1 wherein said reactor is supported on a plurality of support wheels.

9. The process for producing synthetic magnetite according to claim 8 wherein said reactor body turns on said plurality of support wheels.

10. The process for producing synthetic magnetite according to claim 1 wherein said external heating system comprises at least one gas burner located under said reactor.

11. A process for producing synthetic magnetite comprising:
   feeding wustite into a loading zone of a reactor by means of an input screw feeder that is attached to a pendulum input seal system;
   using a water supply or steam supply to supply water or steam into a cooling zone of said reactor that is opposite of said loading zone as a thermochemical transformation reagent;
   using an external heating system to increase the temperature of said thermochemical transformation reagent to between 200° C. and 800° C. to accelerate conversion of wustite to synthetic magnetite;

an output trap that traps gasses, dust and steam pollutants from entering the atmosphere, and an output screw that is attached to a pendulum output seal system, meters the collection of the synthetic magnetite that has a purity of between 95% and 98% by weight.

12. The process for producing synthetic magnetite according to claim 11 wherein the temperature of the reagent is 500° C.

13. The process for producing synthetic magnetite according to claim 11 wherein the external heating system is about 60% of the length of the reactor.

14. The process for producing synthetic magnetite according to claim 11 wherein the water or the steam is supplied to the reactor at a rate of between 57 g and 570 g per kilogram of wustite introduced to the reactor.

15. The process for producing synthetic magnetite according to claim 11 wherein the water or the steam and a mill scale are fed simultaneously into the reactor at opposite ends of the reactor and travel through the reactor in opposite directions.

16. The process for producing synthetic magnetite according to claim 11 wherein the raw material is from a process selected from the group consisting of steel wire drawing, scale from cold rolling iron and hot rolling iron.

17. The process for producing synthetic magnetite according to claim 16, wherein the wustite is mill scale from a process of rolling steel.

18. The process for producing synthetic magnetite according to claim 11 wherein said reactor is supported on a plurality of support wheels.

19. The process for producing synthetic magnetite according to claim 18 wherein said reactor body turns on said plurality of support wheels.

20. The process for producing synthetic magnetite according to claim 11 wherein said external heating system comprises at least one gas burner located under said reactor.

* * * * *